Nov. 24, 1959  J. E. FINK  2,914,175
SCREENING DEVICE
Filed Feb. 14, 1958  2 Sheets-Sheet 1

Inventor
James E. Fink
by Thomas E. Goss
Attorney

Nov. 24, 1959 J. E. FINK 2,914,175
SCREENING DEVICE
Filed Feb. 14, 1958 2 Sheets-Sheet 2

Inventor
James E. Fink
By Thomas E. Goss
Attorney

United States Patent Office 2,914,175
Patented Nov. 24, 1959

2,914,175

SCREENING DEVICE

James E. Fink, West Allis, Wis., assignor to Allis-Chalmers Manufacturing Company, Milwaukee, Wis.

Application February 14, 1958, Serial No. 715,303

6 Claims. (Cl. 209—269)

This invention relates to an improved apparatus for washing or separating intermixed materials. In particular this invention relates to improved apparatus for washing or wet screening and an arrangement for adding water to the material being washed or screened.

The basic concept in screening a material on a vibrating screen is to obtain the stratification of the material as soon as possible after it is placed on the screen surface. The fines of the material placed on the screen and fine particles removed from coarser material while on the screen tend to work to the bottom of the bed while the coarser material tends to work to the top of the bed as a result of the vibratory motion of the screen surface, thereby permitting the fines to pass through the interstices of the screen surface. Although stratification may not be as clearly discernible in wet screening operations as it is in dry screening, it is still true that the more the material is stratified, the more the fines will be in the best position for passing quickly through the screen. In wet screening by adding water and vibrating the bed of material on the screen surface, the fines in the material are suspended in water and pass down through the bed of material and the screen surface more rapidly than in dry screening.

One application of wet screening presently in use is the spraying of water directly on the material from above as it travels across the screen surface. The screening therefore is accomplished by the spray water washing the fine material through the screen surface, while the coarse material is retained thereon. By spraying downward from above the screen surface, the effects of the spray causes near sized particles to lodge in the interstices of the screen, thereby causing blinding of the screen surface. The velocity of the water coming from the spray nozzles under high pressure cuts or erodes the screen, thereby decreasing the screen life. Since the water impinges on the material at high velocity, it will tend to drive the fine particles through the interstices of the screen directly under the sprays, but the water will not thoroughly mix with the material and as a result, effective screening only takes place directly under the sprays.

Another application of wet screening presently in use is the spraying of water from above the screen into washing or repulping pools spaced along the top surface of the screen. These pools are substantially water tight and have no openings for material to pass through. Here the spray water in the pool agitates the material and tends to disperse all of the individual particles into a slurry, so that when the slurry flows from the pool onto a subsequent section of screen surface, the fines in the slurry will pass through the screen surface along with the water, and the coarse material will travel over the screen surface to the next pool. Here spray water collected in this pool again causes agitation and dispersal of the fines along with the other particles of material thus counteracting the tendency to stratify and thereby limiting the amount of fines screened at each successive screen surface.

A screen assembly, according to the present invention, overcomes the problems confronted by the aforementioned applications of washing or wet screening by calling for a number of enclosed pockets arranged to form pools below and spaced along the screen surface. Water is fed into these pockets through suitable piping means, so that the water introduced into the pocket must flow up through the pocket, and through the screen surface which forms the top covering for the pocket. By adding the water in this upflow direction to the surface of the vibrating screen and to the bed of material thereon, the water will flow upwardly through the screen to mix with the material over the pool and the water will move downwardly through the material when the material is over a section of the screen between pools. The application of the water in this manner minimizes reagitation and redispersal of the fines with the other particles of the material. In other words, once the material is stratified, this arrangement for adding water will keep the material stratified and when the material moves from a section of the screen over a pool to a section of the screen between pools, the fines will still be on the bottom of the layer where the downward movement of the water can easily wash the fine material through the screen.

Therefore it is an object of this invention to provide an improved screen assembly and an arrangement for providing water to the screen surface for the intimate mixing of the water with fines of a material on the screen, with a minimum of reagitation and redispersal of the fines with the other particles of the material.

Another object of this invention is to provide a screen assembly having an improved arrangement for mixing water with stratified material on the screen, preliminary to screening in which the water will flow up through the screen surface in order to mix with the bed of material thereon with a minimum remixing of the fines with the oversized material, and the fines are removed by a subsequent downward flow of the water and the stratified fines through subsequent sections of the screen.

Another object of the present invention is to provide an improved screen assembly which will screen or wash materials quickly and effectively and maintain the interstices of the screening surface clean and free from blinding.

The construction and operation of the invention and how the above objects are accomplished will appear from this specification and the accompanying drawings showing an embodiment of the invention, in which.

Figure 1:
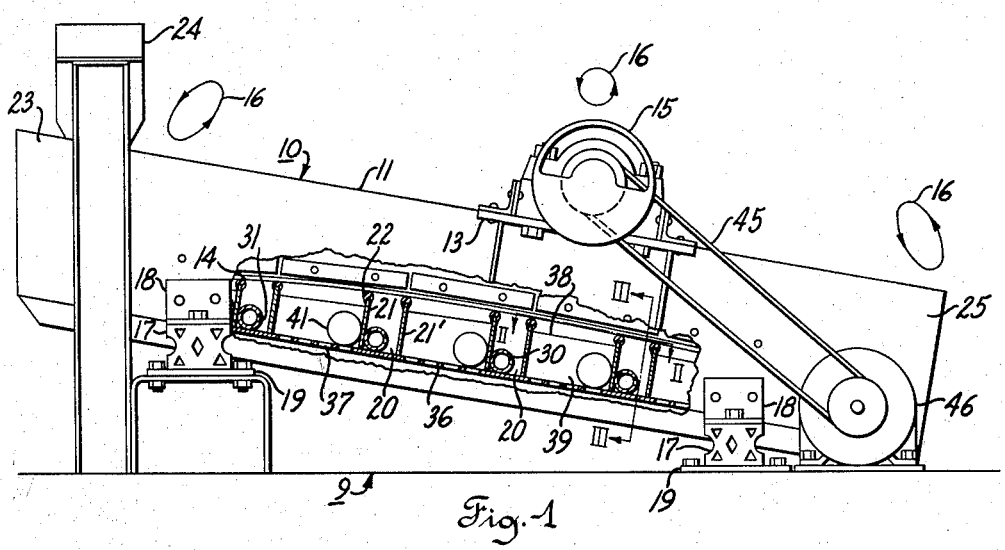
Fig. 1 is a view in elevation with part of the external structure broken away to show a screen assembly equipped with the improved apparatus for washing or separating intermixed materials.

A screen assembly 9 as shown in Fig. 1 comprises a screen member 10 that may have one or more screen deck surfaces supported between side plates 11 and 12; but for illustrative purposes as here shown, the screen member 10 has a single screen deck surface 14.

A vibrating means 15 is connected to the screen member 10 for imparting a vibratory movement thereto. While various types of vibrating mechanisms may be utilized a mechanism of the type illustrated in Fig. 3 of U.S. Patent 2,269,289 may be used. Such a vibrator induces vibration at the various points of the screen member 10 as are indicated by the arrows 16.

The screen member 10 is suitably mounted for vibratory movement, and as here shown rests upon the resilient bearing blocks 17 that are positioned and affixed to the base members 19. The screen member 10 is supported by flanges 18 attached to the tops of the blocks 17, and the screen surface 14 is placed at an angle to the horizontal, so that upon vibration of the screen member 10 material 34 placed on the screen surface 14 advances over the top of the surface in a predetermined direction, which in this case is toward the lower end.

A substantially trough-shaped pocket 20 is arranged beneath the screen surface 14 and transverse to the predetermined direction of the material flowing thereon.

Fluid delivery means are arranged to discharge fluid within the pocket 20 below the level of the screen surface 14, filling the pocket 20 with fluid to provide for the upward flow of fluid from the pocket 20 through the screen surface 14 where the fluid mixes with material on the screen. The fluid and fines of the material then flow downwardly through a portion of screen surface 14 next to the pocket 20. At the feed end 23 of the screen member 10 a head box 24 is positioned to feed material to the screen surface 14, and as previously mentioned, due to the vibration and the inclination of the screen member 10 the material not screened is caused to pass as oversize, in a direction from the feed end 23 to the discharge end 25.

Figure 3:
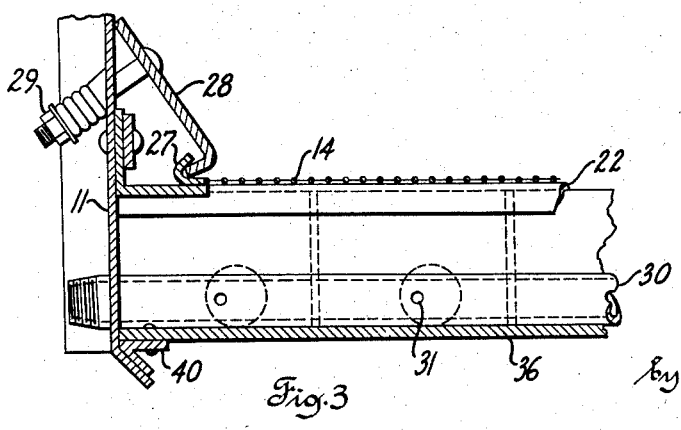
Fig. 3 illustrates a fragmentary sectional end view of Fig. 1 taken on line III—III.

The vibrating screen member 10 is equipped with a screen surface 14 of any desired mesh size. The screen surface 14 may have side strip hooks 27 as shown in Fig. 3 that extend longitudinally of the screen member 10 and are in hooked relation with the tensioning plate 28 that may be adjusted according to the screen surface tension desired, by adjusting the nut, bolt and spring assemblies 29 that are strategically positioned along the side plates 11 and 12 of the screen member 10.

Figure 4:
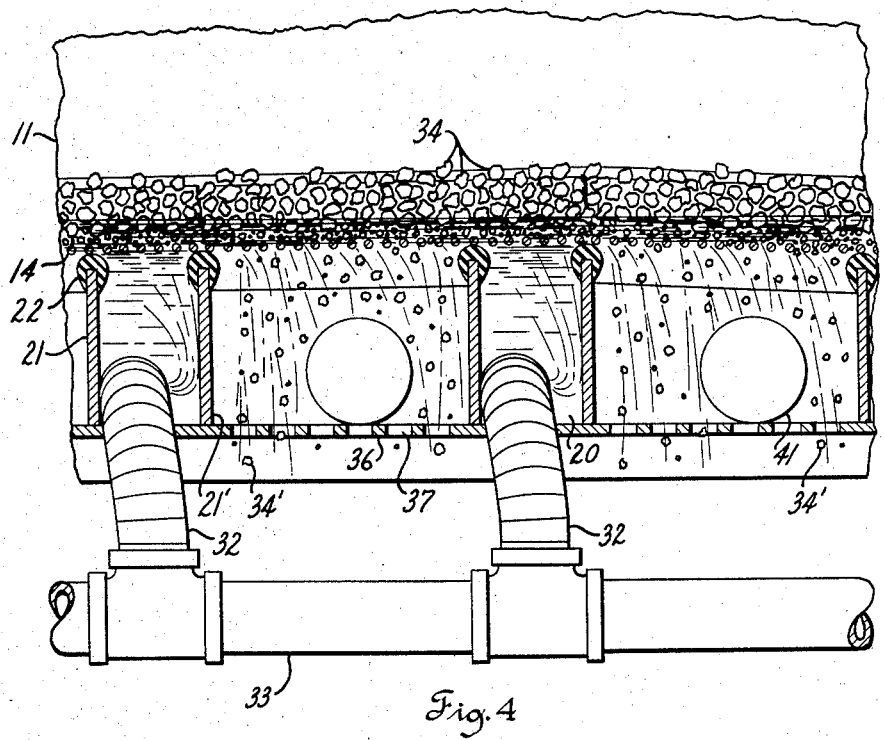
Fig. 4 is an enlarged view of a portion of Fig. 1 showing fluid delivery means and the action of material on the screen.

Below the screen surface 14, as shown in Fig. 4, is located a subdeck 36 having perforations 37 of sufficient size to allow the fines $34^1$ of the material 34 being screened, to pass readily therethrough. A number of the substantially trough shaped pockets 20 are arranged beneath the screen 14 and above the subdeck 36, with the pocket side walls 21 and $21^1$ forming the supporting frame for the sccreen surface. The pockets 20 are positioned transverse to the movement of the material on the screen surface 14 and are spaced apart from each other at selected distances from the feed end 23 toward the discharge end 25 of the screen member 10. The transverse walls 21 and $21^1$ of the pockets 20 have rubber buffer strips 22 in intimate contact with the screen surface 14.

Figure 2:
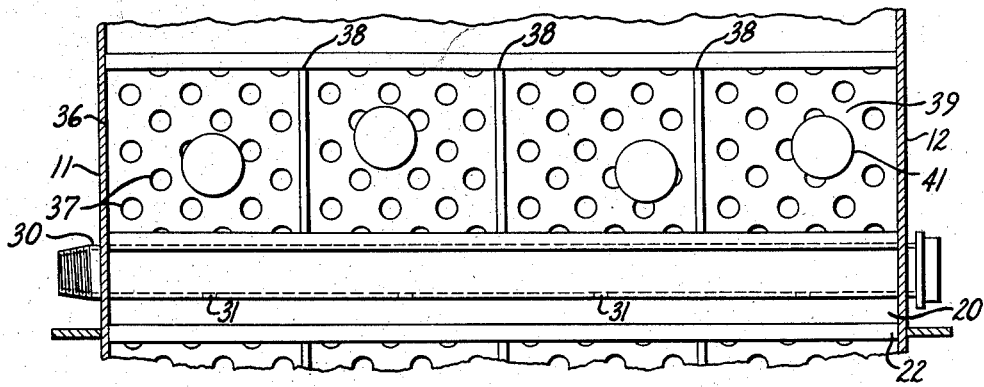
Fig. 2 illustrates a fragmentary sectional plan view of Fig. 1 taken on line II—II.

Intermediate the respective pockets 20, the screen surface 14 and the subdeck 36, as shown in Fig. 2, a series of bars 38, spaced in parallel relation to side walls 11 and 12 are used to form compartments 39. Within these compartments 39 are placed resilient balls 41 which bounce up against the screen surface 14 to keep the surface free of blinding. By placing the resilient balls 41 within each of the compartments 39 the entire area of the screen cloth 14 is kept in a state of vertical vibration facilitating passage of the screened material fines $34^1$ therethrough. The subdeck 36, as shown in Fig. 3, may rest upon the inwardly turned flanges 40 of the side plates 11 and 12.

The vibrating means 15, in Fig. 1, is connected to the screen member 10 through a saddle mount 13 provided by the side plates 11 and 12, and power is supplied to the vibrating mechanism 15 through a belt 45 that is connected to a motor 46.

A fluid pipe 30 is positioned within each of the trough shaped washing pockets 20. The fluid pipe 30 extends along the side wall 21 of the pocket 20, and as shown in the illustrated embodiment in Fig. 2, through the side plates 11 and 12 of the vibrating screen member 10. However, fluid supply means may be arranged in any suitable manner so long as fluid is supplied to discharge in the pocket 20 below the screen surface 14 to provide an upflow of fluid from the pocket 20 to the screen surface 14. The fluid pipes 30 have a number of interspaced orifices 31 that are positioned to assure constant fluid pressure throughout the entire length of the pocket 20. The fluid pipes 30 are securely retained within the pocket 20, and flexible couplings 32, as shown in Fig. 4, are provided leading from the pipe 30 for attachment to an external fluid supply source 33. Though not shown, valves may be inserted between the flexible coupling 32 and the fluid pipe 30 so that the pressure and therefore the velocity of the water in each pocket 20 may be individually adjusted to the accomplish the desired screening.

In the operation of the screen assembly 9 material 34 shown in Fig. 4 in either a dry or slurry form, is introduced into the stationary headbox 24. The material 34 in the headbox 24 is spread evenly over the full width of the screen surface 14 at the feed end 23. Because screen member 10 is supported on an incline to the horizontal, and through the vibratory movement provided thereto, the material 34 is moved along the screen surface 14 toward the lower end. If the material is in the form of a slurry the fluid that is present, for example water, as it comes onto the screen surface 14 will pass therethrough carrying with it some of the fines $34^1$ of the material 34. As shown in Fig. 4 the material 34 travels over the screen surface 14 and therefore over the top of each of the washing pockets 20. The enclosed washing pockets 20 are below and in contact with the under side of the screen surface 14. The water that is introduced into each pocket 20 must flow through the orifices 31 in pipe 30 up through the pocket and through the screen surface 14 that forms the top covering for each pocket. The water having passed up through the screen surface 14 mixes with the stratified fines $34^1$ of the material 34 traveling on top of the screen surface 14. The addition of the water in this manner minimizes the redispersal of fines, and so the fines remain at the bottom of the layer where they can most easily be washed down through subsequent sections of screen surface 14. This operation is repeated as the material moves along the screen surface and passes over the top of the next upflow washing pocket 20 where more water is added to aid in the screening.

In a preferred embodiment of this invention illustrated in the drawings, water is introduced into the pockets through the pipes 30 that have orifices 31 interspaced throughout the length of pipe 30 thereby allowing equal water distribution throughout the washing pocket. The orifices 31 in the pipes 30 in this particular illustration are aimed parallel to the screen surface 14, and testwork has indicated that this arrangement results in a minimum collection of fines in the pockets 20. However, the orifices 31 may be otherwise aimed without sacrificing the advantages of the present invention.

From the foregoing it will be apparent to those skilled in the art that the illustrated embodiment of the invention provides a new and improved vibrating screen assembly for washing or separating intermixed materials and accordingly accomplishes the object of the invention. It should, however, be understood that it is not intended to limit the invention to the exact construction and arrangement of the parts described herein, as various modifications within the scope of the appended claims may occur to those skilled in the art.

What is claimed is:

1. A screen assembly comprising: a screen member for separating particles of less than a predetermined size, said screen member being mounted for vibratory movement, vibrating means for imparting a vibratory movement to said screen member for agitating and advancing material across the top surface of said screen member in a predetermined direction, a plurality of trough shaped substantially water tight pockets arranged beneath said screen member transversely of said predetermined direction and in spaced relationship to each other, and fluid delivery means arranged to discharge fluid within each of said pockets below the level of said screen member to fill each of said pockets with fluid and provide an upward flow of fluid from each of said pockets through said portion of said screen member and a subsequent downward flow of fluid through a subsequent portion of said screen member superposed intermediate adjacent of said pockets.

2. A screen assembly comprising: a screen member for the separation of material particles of less than a predetermined size, said screen member being mounted for vibratory movement and having a screening surface, said screen member having a material feed and discharge end; vibrating means for imparting a vibratory movement to said screen member for agitating and advancing material across said screen surface in a predetermined direction; a plurality of trough shaped substantially water tight pockets arranged beneath first portions of said screen surface and transverse to said predetermined direction, said pockets being positioned intermediate to said feed and discharge end in spaced substantially parallel relationship to each other; and fluid delivery means arranged to discharge fluid within each of said pockets to fill each of said pockets with fluid and provide an upward flow of fluid from each of said pockets through said portions of said screen surface and a subsequent downward flow of fluid through other portions of said screen surface intermediate said first portions.

3. A screen assembly comprising: a screen member for separating particles of less than a predetermined size, said screen member being mounted for vibratory movement; vibrating means for imparting a vibratory movement to said screen member for agitating and advancing material across the top surface of said screen member in a predetermined direction; a plurality of trough shaped substantially water tight pockets arranged beneath said screen member and transverse to said predetermined direction, said pockets being spaced apart from each other selected distances in said predetermined direction each of said pockets comprising a base portion, a pair of spaced wall portions mounted upon said base portion and extending away therefrom toward said screen member to terminate in an edge disposed in spaced proximity thereto, and a pair of flexible sealing strips, one of said strips being mounted on each of said edges intermediate said wall portion and said screen member and extending into intimate sealing engagement with the lower surface of said screen member to preclude the exit of fluid from said pocket other than up through said screen member; fluid delivery means arranged to discharge fluid within said pockets below the level of said screen member to fill said pockets with fluid and provide an upward flow of fluid from said pockets through said screen member and a downward flow of fluid through portions of said screen member over said space between said pockets.

4. A screen assembly comprising: a screen member having a screening surface for separating material particles of less than a predetermined size, said screen member being mounted for vibratory movement; vibrating means for imparting a vibratory movement to said screen member for agitating and advancing material across said screen surface in a predetermined direction; a plurality of substantially trough shaped pockets arranged beneath said screen surface and transverse to said predetermined direction, said pockets being spaced apart from each other selected distances in said predetermined direction and the spaces intermediate said pockets forming active effective screening portions; flexible means operatively disposed between said screen member and each of said pockets in intimate sealing engagement therewith for preventing passage of fluid from said pockets axially of said screen member; a fluid pipe within each of said pockets and transverse to said predetermined direction, said fluid pipe having a number of orifices; fluid supply means connected to each of said fluid pipes to fill said pipes with fluid and discharge fluid through said orifices to provide an upward flow of fluid from said pockets through said screen surface to said material and a downward flow of said fluid and said material particles of less than a predetermined size through said active screening portions intermediate said pockets.

5. A screen assembly comprising: a screen member having a screening surface for separating material particles of less than a predetermined size, said screen member being mounted for vibratory movement; vibrating means for imparting a vibratory movement to said screen member for agitating and advancing the material across said screen surface in a predetermined direction; a plurality of substantially trough shaped pockets arranged beneath said screen surface in sealed engagement therewith and transverse to said predetermined direction, said pockets being spaced apart from each other selected distances in said predetermined direction and the spaces intermediate said pockets forming the screening portions; a fluid pipe within each of said pockets and transverse to said predetermined direction, said fluid pipe having a plurality of longitudinally spaced orifices; fluid supply means; flexible connecting means between said fluid supply means and said pipes to fill said pipes with fluid and discharge fluid through said orifices to provide an upward flow of fluid from said pockets only through said screen surface to said material and a downward flow of said fluid and said material particles of less than a predetermined size through said screening portions intermediate said pockets.

6. A screen assembly comprising: a vibratable screen member; means for vibrating screen member; a subdeck mounted beneath said screen member and having a plurality of spaced foraminous zones in juxtaposition with a plurality of spaced nonforaminous zones and to define therebetween zone boundaries extending transversely of the longitudinal axis of said screen member; a plurality of upstanding plates mounted coterminously with said zone boundaries and coacting with said nonforaminous zones to define therebetween a plurality of substantially water tight pockets juxtaposed with said foraminous zones; sealing means operatively disposed intermediate said plates and said screen member in intimate sealing engagement therewith to prevent fluid communication between said zones and said pockets beneath said screen member, and a plurality of fluid supply means disposed one in each of said pockets beneath said screen member to provide an upward flow of fluid from said pockets through said screen member and a downward flow of said fluid through said screen member into said foraminous zones.

References Cited in the file of this patent
UNITED STATES PATENTS

| | | |
|---|---|---|
| 826,178 | Marrs | July 17, 1906 |
| 952,061 | Akins | Mar. 15, 1910 |
| 1,111,217 | Cole | Sept. 22, 1914 |
| 1,312,324 | Hawkins | Aug. 5, 1919 |
| 2,269,289 | Schifflin et al. | Jan. 6, 1942 |
| 2,518,451 | Daman | Aug. 15, 1950 |
| 2,592,605 | Searles | Apr. 15, 1952 |
| 2,638,220 | Schneider | May 12, 1953 |